United States Patent
Nguyen

[19]

[11] Patent Number: 5,969,914
[45] Date of Patent: Oct. 19, 1999

[54] DATA STORAGE CARTRIDGE AND DRIVE WITH AN INTERLOCK

[75] Inventor: Greg Nguyen, San Jose, Calif.

[73] Assignee: Iomega Corporation, Roy, Utah

[21] Appl. No.: 08/928,189

[22] Filed: Sep. 12, 1997

[51] Int. Cl.[6] .................................................. G11B 23/03
[52] U.S. Cl. .................................................... 360/133
[58] Field of Search ................................ 360/133, 99.02, 360/99.06; 369/291

[56] References Cited

U.S. PATENT DOCUMENTS

| | | | |
|---|---|---|---|
| 4,400,748 | 8/1983 | Bauck et al. | 360/99 |
| 4,864,452 | 9/1989 | Thompson et al. | 360/133 |
| 4,901,173 | 2/1990 | Jones et al. | 360/99.04 |
| 5,218,503 | 6/1993 | Martin | 360/133 |
| 5,262,918 | 11/1993 | Tannert | 360/133 |
| 5,280,403 | 1/1994 | Martin | 360/133 |
| 5,398,141 | 3/1995 | Tannert | 360/133 |
| 5,422,775 | 6/1995 | Martin | 360/133 |
| 5,583,710 | 12/1996 | Nicklos et al. | 360/71 |
| 5,768,074 | 6/1998 | Sumner et al. | 360/133 |
| 5,808,997 | 9/1998 | Yamamiya | 369/77.2 |
| 5,831,967 | 11/1998 | Otsuka et al. | 369/291 |

FOREIGN PATENT DOCUMENTS

| | | |
|---|---|---|
| 0 524 839 A | 1/1993 | European Pat. Off. . |
| 0 739 011 A1 | 10/1996 | European Pat. Off. . |
| 2208330 | 3/1989 | United Kingdom . |
| WO 96/36048 | 5/1998 | WIPO . |

*Primary Examiner*—George J. Letscher
*Attorney, Agent, or Firm*—Woodcock Washburn Kurtz Mackiewicz & Norris LLP

[57] ABSTRACT

A cartridge for a disk drive has a rigid shell with a keying ear and two keying grooves. The keying ear is located on the rounded front at one corner between the top and bottom surfaces of the cartridge shell. The ear cooperates with a projection located in the drive along the drive receiving slot. The keying grooves are along the top and bottom edges of one side of the cartridge. These groves mate with projections on the cartridge receiving slot in the drive. One of the grooves extends deeper into one planar surface of the cartridge than the other grove. Both keys prevent insertion of the cartridge with any other orientation of the cartridge than the correct orientation.

20 Claims, 8 Drawing Sheets

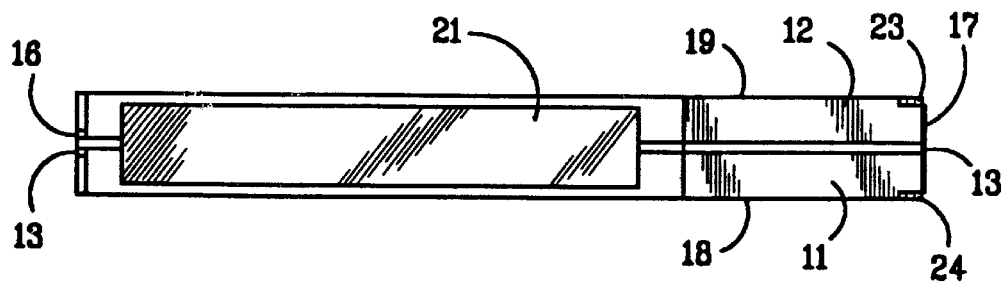
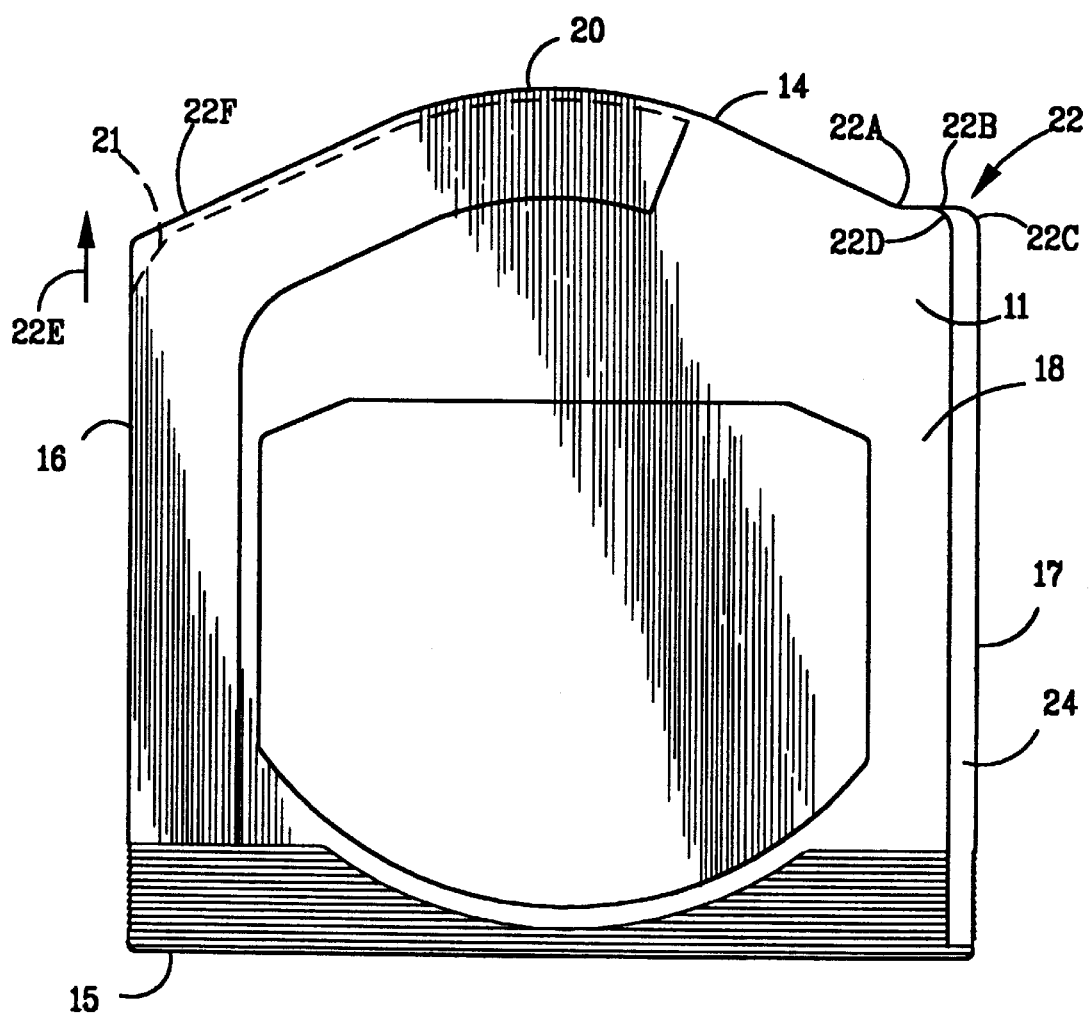

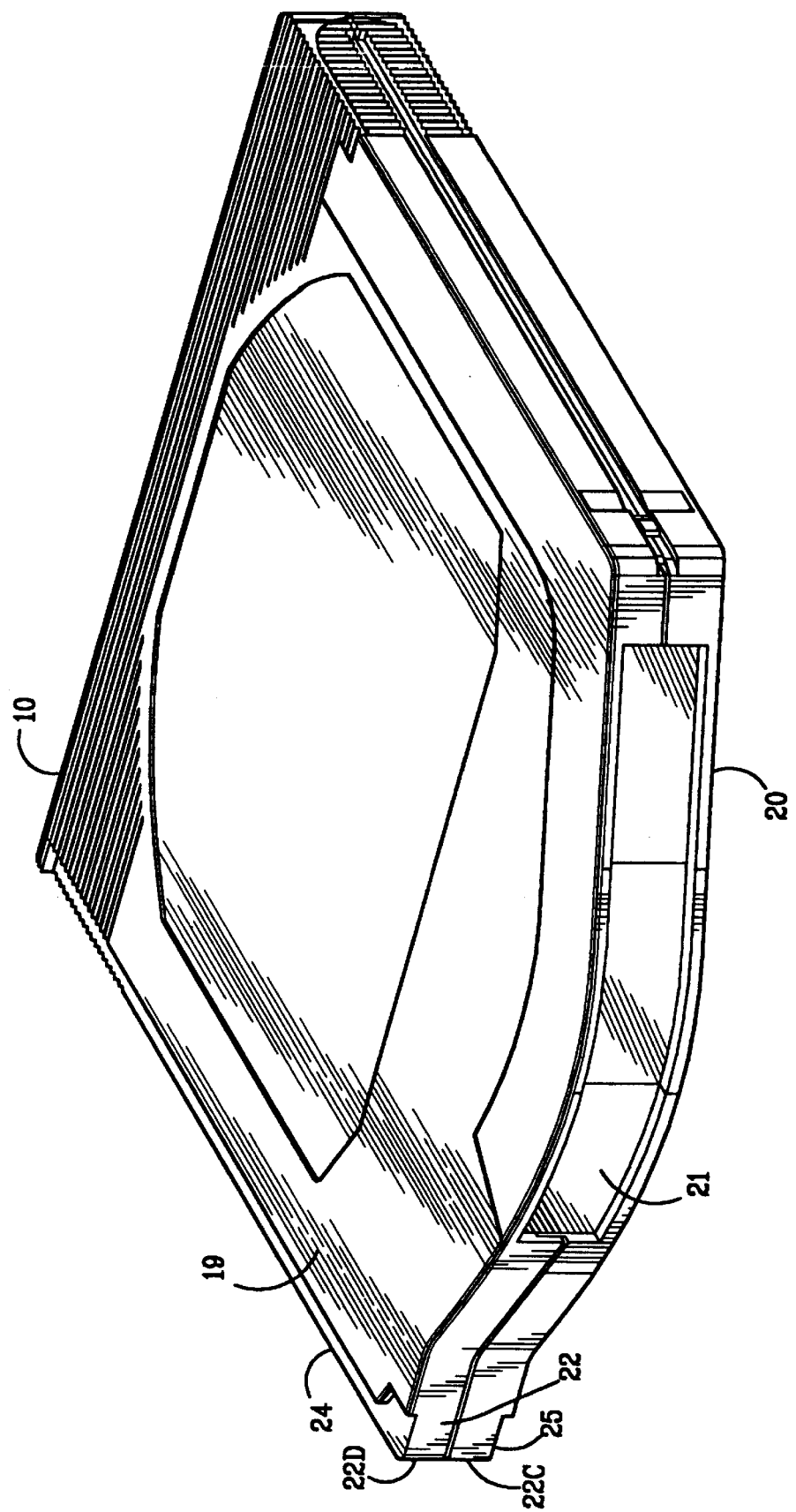

DATA STORAGE CARTRIDGE AND DRIVE WITH AN INTERLOCK

FIELD OF THE INVENTION

This invention relates to data storage drives and, more particularly, to a removable cartridge for magnetic disk drives that contains an ear located in the front of the cartridge to keep the cartridge secure for proper drive operation.

BACKGROUND OF THE INVENTION

Magnetic disk drives which write and read digital data from flexible magnetic disks have been extensively used. "Floppy disk drives" have been extensively used for small, so-called microcomputer systems, for word processing applications and the like. The flexible disk cartridge includes a relatively thin, flexible jacket which is inserted into the floppy disk drive.

"Bernoulli" disk drives having performance characteristics similar to that of fixed disk drives, but with removable cartridges, have been used. A flexible magnetic disk is enclosed in a rigid box which is normally completely closed. U.S. Pat. No. 4,400,748-Bauck, et al and related patents to the common assignee show such drives using Bernoulli stabilized flexible disks. U.S. Pat. No. 4,901,173-Jones et al and related patents to a common assignee, show improvements which relate to so-called "half height" drives.

Rigid disk drives, such as the IBM 3350, usually have a fixed rigid magnetic media. The magnetic heads do not contact the magnetic surface, but ride on a thin film of air. Because of this, and other features, these disk drives are capable of extremely precise and high speed operation. This type of disk drive is commonly referred to as a "Winchester" drive. Rigid disks enclosed in a rigid, removable cartridge, or shell have also been used. U.S. Pat. No. 4,864,452-Thompson, et al is an example of such a drive.

Winchester drives utilize a rigid magnetic media for recording the desired data. This is different from the flexible media found in Bernoulli drives. The JAZ™ drive sold by the assignee of the present invention uses such rigid media and Winchester type heads in data storage drives.

The particular shape of the cartridge visually identifies to the user that it can be inserted into the intended drive. However, this shape allows other similar sized cartridges to be inserted.

U.S. Pat. No. 5,768,074 (Ser. No. 08/752,823) shows a cartridge for use with the JAZ™ Drive sold by Iomega Corp., assignee of the present applicant. The JAZ™ cartridge shown in this patent has keying slots which prevent improper insertion of the cartridge. Most removable cartridge drives (magnetic and optical) typically use approximately the same form factor cartridges, i.e., 3.5", 5.25", etc. Hence if one of these cartridges is inserted into the cartridge slot of a non-mating drive there is a high probability that either the drive (heads, load mechanism, electronics, etc.) or the data on the disk could be damaged.

U.S. Pat. Nos. 5,218,503 Martin and 5,280,403-Martin describe a disk drive with a cartridge which has a beveled edge. The beveled edge is compatible with a slanted portion of the disk drive in order to ensure that the cartridge is inserted into the drive in the proper orientation and that the cartridge is properly inserted in the drive, so that the heads can be unloaded onto the disk. U.S. Pat. No. 5,262,918-Tannert shows a cartridge having a door opening groove and a guide groove. The guide groove cooperates with an interlocking recess in the drive to center the position and hold the cartridge in the drive.

U.S. Pat. Nos. 5,398,141-Tannert and 5,422,775-Martin show hard disk cartridges and drives having 2.5" and 3.5" form factors respectively. These patents, assigned to SyQuest Technology, Inc., show cartridges having a square front. The SyJet cartridge sold by SyQuest® has a rounded front with "ears" on both sides.

U.S. Pat. No. 5,583,710-Nicklos, shows a disk drive having an automatic spindle motor loading mechanism that for the JAZ™ drive sold by Iomega, Corp., assignee of the present applicant. The JAZ™ drive shown in this patent as used for writing and reading data to and from a disk contained in a cartridge. The cartridge is inserted through an opening into the disk drive which includes a motor ring ratably mounted in the disk drive and a spindle motor for rotating the disk. The spindle motor is mounted in the motor ring such that rotation of the motor ring moves the spindle motor into and out of engagement with the hub of the disk cartridge. A position transducer provides an output signal indicating the essential position of the motor ring. A load/eject motor controls the rotation of the motor ring in response to the output signal from the position transducer.

A problem arises when the storage capacity of cartridges used in such drives is increased. With this increase, it is desirable that the new data storage drives will accommodate earlier disk cartridges. The new drive is capable of operating on prior cartridges having smaller data capacity. However, the converse is not true, the old data storage drives can not operate on the new data storage cartridges. This "backwards" compatibility is made possible by the present invention.

SUMMARY OF THE INVENTION

In accordance with the invention, the front of the cartridge is rounded and has a keying ear located on the rounded front at one corner between the top and bottom surfaces of the cartridge shell. This ear prevents insertion of similar sized cartridges which are not compatible with older drives. The ear cooperates with a projection located internally in the drive along the opening of the slot into which the cartridge is inserted. Because of the ear, the cartridge will not operate in the interlock mechanism in prior drives.

On the other hand the drive of the present invention provides backwards compatibility for the cartridge. The keying ear will prevent the use of this cartridge in earlier data storage drives because with the ear, the cartridge will not engage the cartridge loading mechanism of earlier drives. However, the drive of the present invention will accommodate the new cartridge with the ear.

The foregoing, and other features, advantages and objects of the invention will be better understood from the following more detailed description and appended claims.

BRIEF DESCRIPTION OF THE DRAWINGS

The accompanying drawings which are incorporated in and constitute a part of the specification, illustrate the preferred embodiment of the invention and together with the description, serve to explain the principles of the invention.

The invention will now be further described by way of example, with reference to the accompanying drawings, in which:

FIG. 1 shows a top view of the cartridge of the present invention;

FIG. 2 is a front view of the cartridge;

FIG. 3 is an isometric view of the cartridge with the door closed;

DETAILED DESCRIPTION OF THE PREFERRED EMBODIMENT

Figure 4:
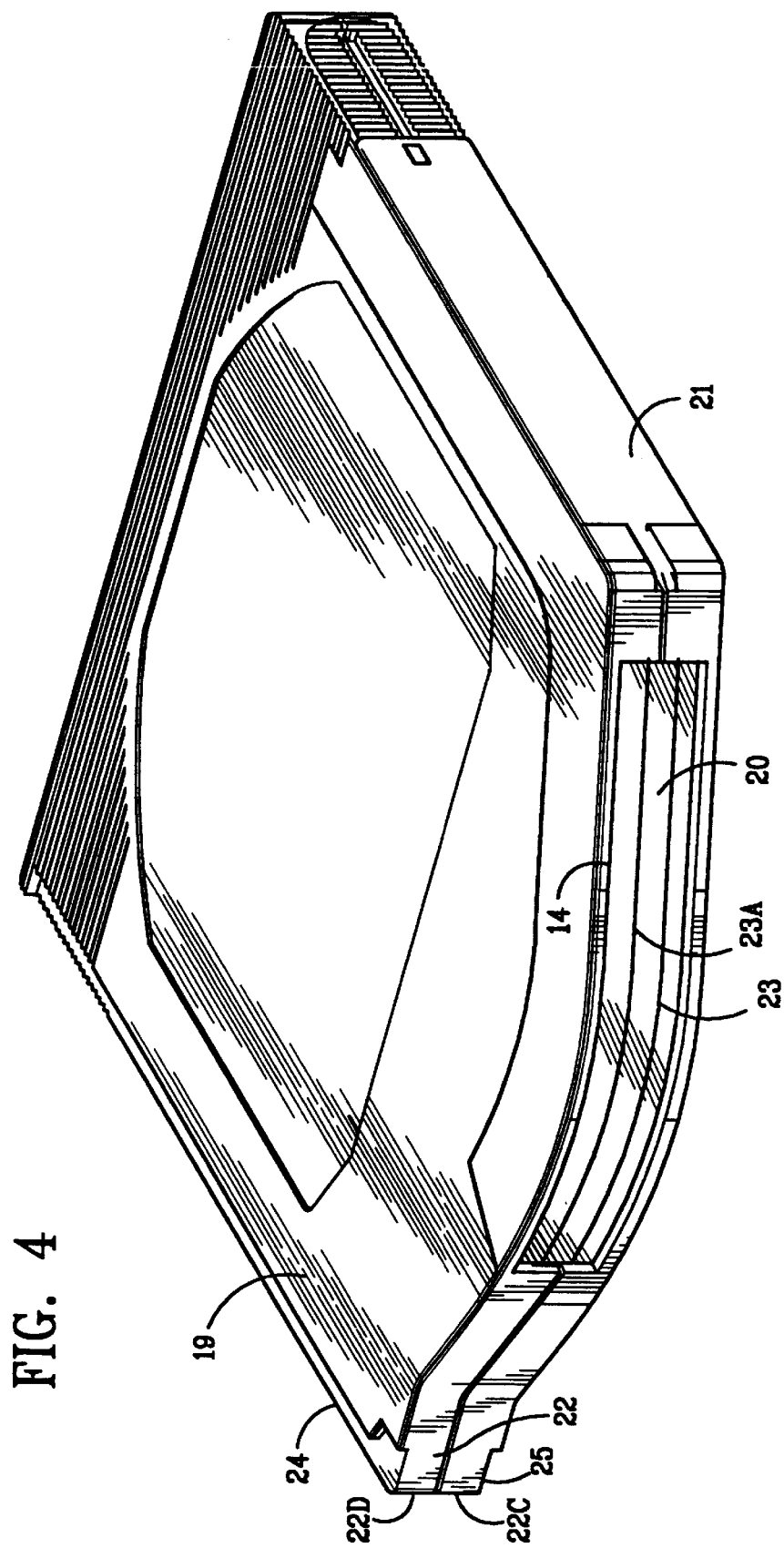
FIG. 4 is an isometric view of the cartridge with the door open.

FIGS. 1–4 show a cartridge having two halves 11 and 12 joined together at 13. The cartridge has a front 14, a back 15 and two sides 16 and 17 between substantially flat, planar surfaces 18 and 19. An opening 20 in the front of the cartridge provides access for the read/write heads to the recording disks 23, 23A (FIG. 4). A flexible door 21 covers the opening when the cartridge is removed from the drive.

A keying ear 22 located in the rounded portion of the cartridge front 14 between the cartridge opening 20 and cartridge side 17, prevents the cartridge from being operated upon in a drive without the interlocking mechanism of the present invention.

Two halves 11 and 12 when joined together at 13 form the keying ear 22. The keying ear extends to a radius 22A where the ear meets the rounded front portion 14. A relatively flat portion 22B extends from radius 22A to the corner of the cartridge. The flat portion 22B is closer to the front 14 of the cartridge than the corresponding edge of the prior cartridge. Stated another way, the flat portion 22B extends further in the back to front direction 22E than the corresponding portion 22F of the front of the shell which does not have the ear. The ear 22 is at the corner of the cartridge which is opposite to the cartridge corner nearest the opening 20. The keying ear terminates at corners 22C and 22D on the top 19 and bottom 18 planar surfaces.

Keying grooves 24 and 25 extend along the bottom and top edges of the side 17 of the shell. These keying grooves prevent the cartridge from being inserted into the drive with the wrong orientation.

The groove 25 extends deeper into the planar surface 18 than the other groove 24 extends into the planar surface 19. The corresponding projections on the drive match these differently extending grooves so that the cartridge can be inserted only with the proper orientation.

Figure 5:
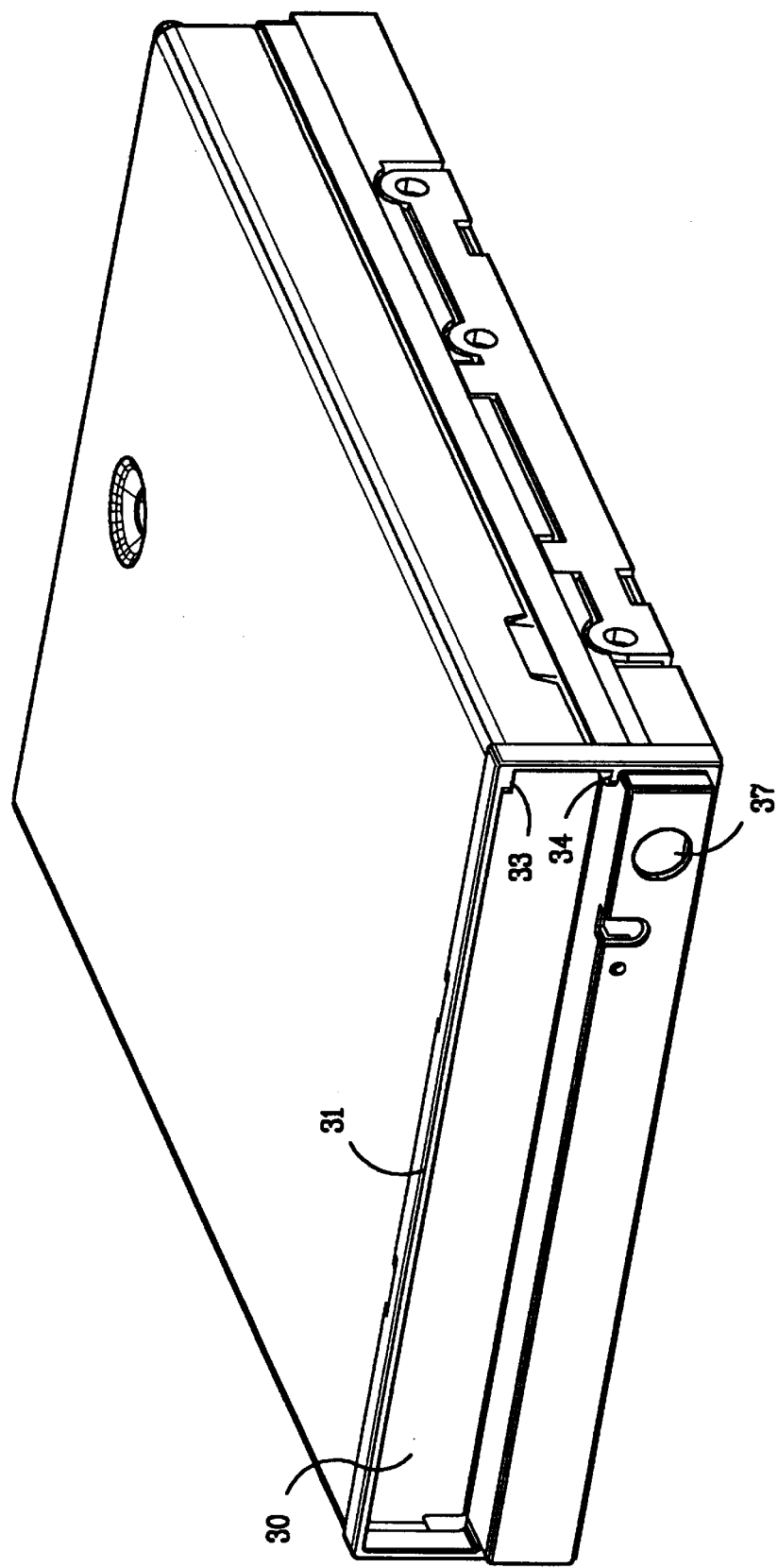
FIG. 5 shows the drive.

FIG. 5 shows the drive. A slot 30 in front of the drive receives the cartridge which is inserted into the drive for engagement of the read/write heads in the drive with the recording medium.

Figure 5A:
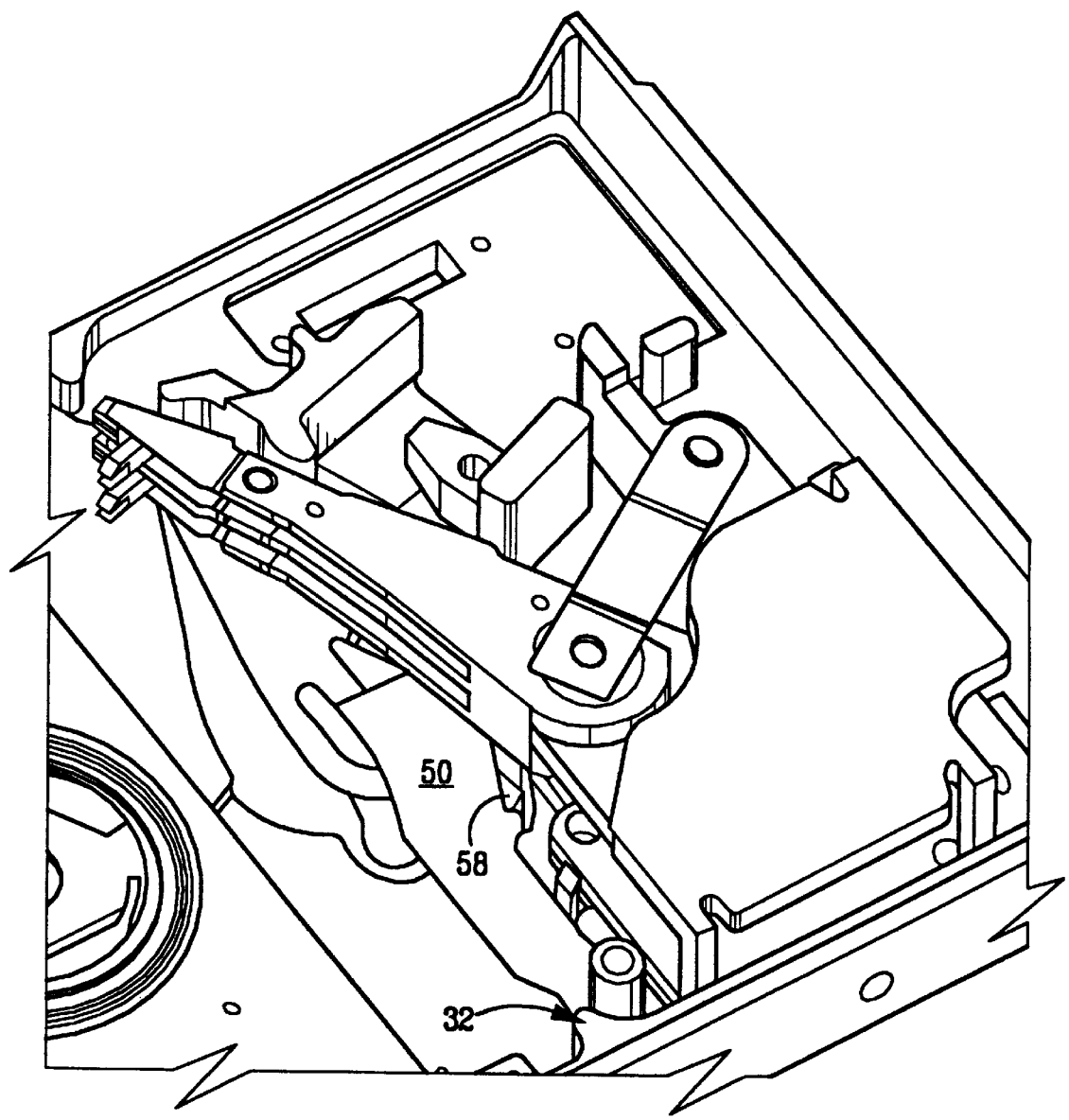
FIG. 5A is an exploded perspective view of the disk drive of FIG. 5 with its outer housing removed to expose the drive chassis and various components mounted thereon.

FIG. 5A shows a perspective view of the prior art drive of U.S. Pat. No. 5,583,710 with the cover removed. The disclosure of that patent is incorporated herein by reference. As described in column 5, lines 16 etc. of that patent an eject lever 50 has a cartridge push tab 58 which engages the forward end face of a disk cartridge when the cartridge is inserted in the disk drive through the opening in the front panel of the drive. Continued insertion of the disk cartridge causes the eject lever 50 to pivot toward the rear end of the drive. As the eject lever 50 pivots toward the rear end of the disk drive a cam surface slides to release a pin which allows the motor ring to rotate. This unlocks the spindle motor. The projection 32 stops the continued insertion which unlocks the spindle motor as just described. Also, as described fully in U.S. Pat. No. 5,583,710, the drive has a loading eject mechanism which is cocked by full insertion of the cartridge.

In accordance with the present invention, the ear 22 on the cartridge prevents cartridges with the ear from unlocking the spindle motor. The ear 22 engages the projection, or stop, 32 thereby preventing the continued insertion which unlocks the spindle motor and cocks the eject mechanism. Stop 32 is positioned in the drive to align the cartridge hub correctly with the spindle motor in the drive.

Figure 5B:
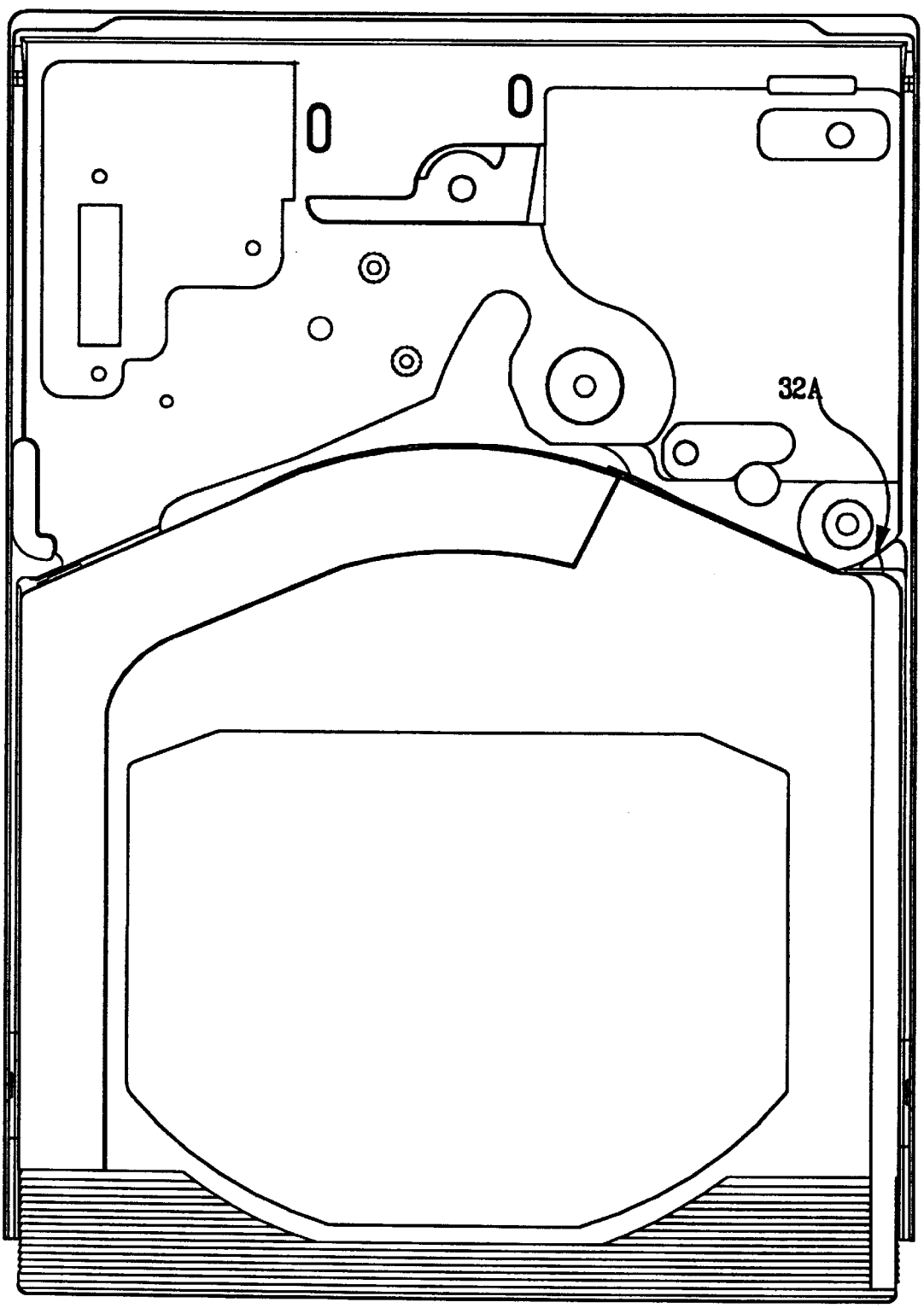
FIG. 5B is a top view of the disk drive of FIG. 5, having a cartridge inserted, with its outer housing removed to expose the drive, chassis and various components mounted thereon.
Figure 5C:
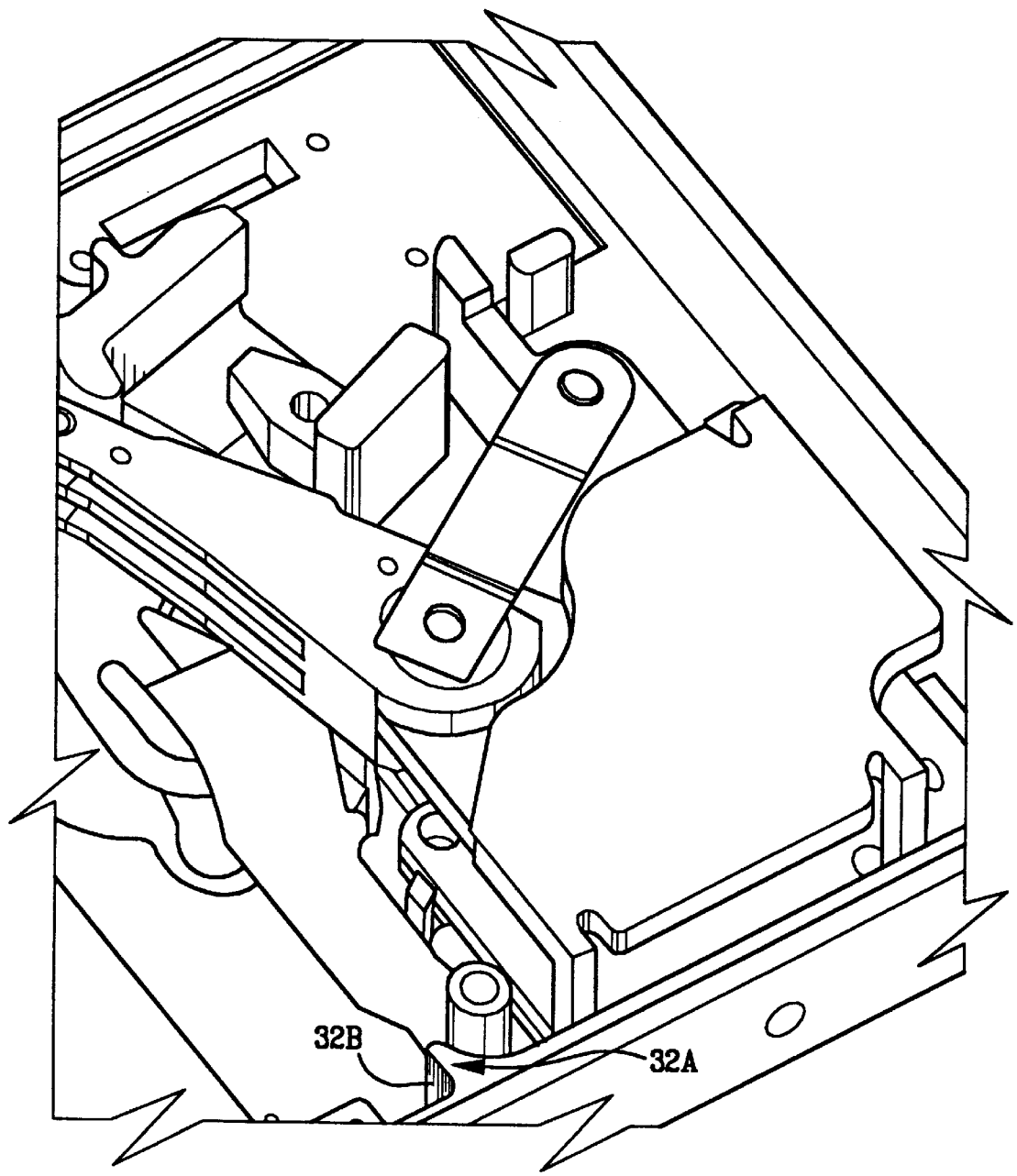
FIG. 5C is an exploded view of the disk drive in FIG. 5A.
Figure 6:
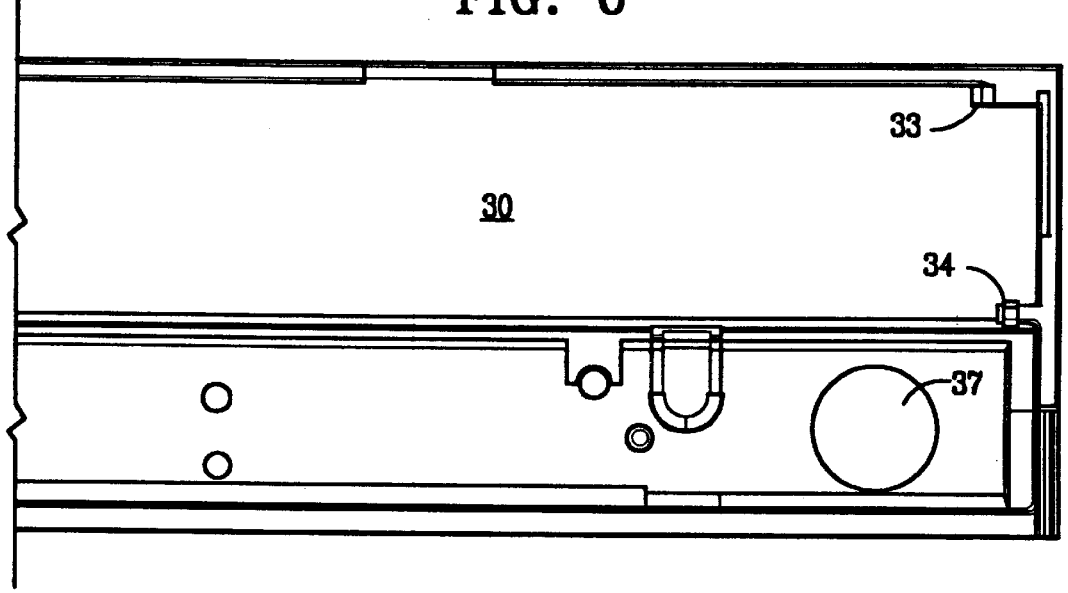
FIG. 6 is a front view of the front panel.
Figure 7A:
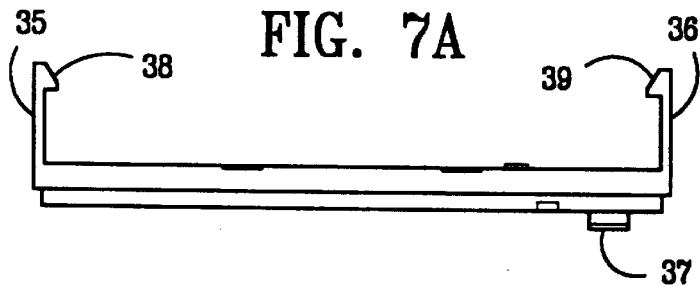
FIGS. 7A–7C are top, front and side views of the front panel
Figure 7B:
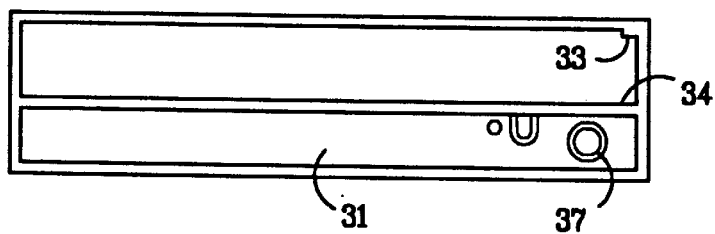
Figure 7C:
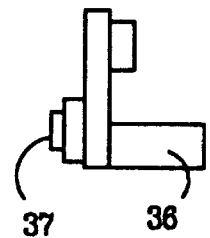

However, as shown in FIGS. 5B and 5C the drive of the present invention has a modified interlock projection 32A located internally along the drive slot. The interlock projection 32A has been cut away to allow continued cartridge insertion which unlocks the spindle motor. The projection area 32B has been cut away from projection 32A, to make it narrower in the back to front direction. This allows the cartridge with the ear to the full travel distance of insertion. The cartridge ear 22 cooperates with interlock projection 32A to unlock the spindle motor and cock the eject mechanism. The size and shape of the interlock projection 32 also allows the cartridge with the keying ear 22 to properly engage the cartridge loading/eject mechanism assembly. The size, shape, and placement of the projection 32A in the drive also allows for cartridges without the keying ear 22 to engage the cartridge loading mechanism assembly.

The interlock projection 32 of earlier JAZ™ drives maintains a shape and position that prevent cartridges containing a keying ear 22, to properly engage the drive loading mechanism assembly, rendering such "eared" cartridges as incompatible.

The front panel 31 is shown in FIGS. 6, 7A–7C. Legs 35, 36 have hooks 38, 39 which snap onto the chassis of the drive. Button 37 ejects the cartridge.

Other embodiments of the invention are possible. The appended claims are, therefore, intended to cover all embodiments within the true spirit and scope of the invention.

What is claimed is:

1. A cartridge for a drive having an interlock and read/write heads which record data in said cartridge comprising:
    a shell having a front, a back, and two sides between substantially flat, planar surfaces;
    a recording medium in said shell;
    an opening in said shell for access by said read/write heads to said recording medium; and
    a keying ear on said front of said cartridge between said planar surfaces at one side of said shell, said keying ear preventing operation of a drive which does not have the proper interlock to cooperate with said keying ear.

2. The cartridge recited in claim 1 wherein said front is rounded and wherein said flat portion is joined by a radius to said rounded front.

3. The cartridge recited in claim 2, wherein said opening is at one side of the front of said cartridge and said ear is at the other side of the rounded front portion of said cartridge.

4. The cartridge recited in claim 3 wherein said opening is in the front of said shell near one corner of said cartridge and wherein said flat portion extends from said radius to the other corner of the cartridge opposite to the corner near said opening.

5. The cartridge recited in claim 1, further comprising:

two keying grooves along the top and bottom edges of one side of said shell, one of said keying grooves extending deeper into one of said planar surfaces than the other groove extends into the other planar surface to prevent said cartridge from being inserted into said drive with the wrong orientation.

6. The combination of a cartridge and a drive for reading/recording data on said cartridge, said drive comprising:
- read/write heads for reading and recording data on said cartridge; and
- interlocking means for locking said drive normally and for unlocking said drive only when the proper cartridge is inserted;

said cartridge comprising:
- a shell having a front, a back, and two sides between substantially flat, planar surfaces;
- a recording medium in said shell;
- an opening in said shell for access by said read/write heads to said recording medium; and
- a keying ear on one corner of the front of cartridge between said planar surfaces at a side of said shell, said keying ear preventing operation by a drive which does not have the proper interlocking means to cooperate with said keying ear.

7. The cartridge recited in claim 6 wherein said front is rounded and wherein said flat portion is joined by a radius to said rounded front.

8. The cartridge recited in claim 7, wherein said opening is at one side of the front of said cartridge and said ear is at the other side of the rounded front portion of said cartridge.

9. The cartridge recited in claim 8 wherein said opening is in the front of said shell near one corner of said cartridge and wherein said flat portion extends from said radius to the other corner of the cartridge opposite to the corner near said opening.

10. The combination recited in claim 6 wherein said drive further comprises;
- a spindle motor for engaging the recording medium in said cartridge to rotate it and wherein said interlocking means includes a lock preventing rotation of said spindle motor until a cartridge is completely inserted in said drive.

11. The combination recited in claim 10 wherein said interlocking means further comprises;
- a projection engaged by a corner of a cartridge inserted in said drive;
- said projection being sufficiently narrow in said back to front direction to allow complete insertion of said cartridge.

12. The combination recited in claim 11 wherein said projection is a stop preventing continued insertion of said cartridge past said stop.

13. The combination recited in claim 6 wherein said drive further comprises;
- a cartridge eject mechanism, said cartridge eject mechanism being operative upon complete insertions of said cartridge.

14. The combination recited in claim 13 wherein said interlocking means further comprises;
- a projection engaged by a corner of a cartridge inserted in said drive;
- said projection being sufficiently narrow in said back to front direction to allow complete insertion of said cartridge.

15. The combination recited in claim 14 wherein said projection is a stop preventing continued insertion of said cartridge past said stop.

16. The cartridge recited in claim 6, wherein said drive further comprises:
- a slot into which said cartridge is inserted for engagement of said read/write heads with said recording medium.

17. The combination recited in claim 16 wherein said cartridge has:
- two keying grooves along the top and bottom edges of one side of said shell, one of said keying grooves extending deeper into one of said planar surfaces than the other groove extends into the other planar surface to prevent said cartridge from being inserted into said drive with the wrong orientation; and wherein said drive further comprises:
- two projections at an opening of said slot, said projections mating with said keying grooves to endure proper insertion of said cartridge into said drive.

18. The combination recited in claim 17, where said drive includes a front panel having said slot therein, said projections being on said front panel.

19. The combination recited in claim 18 wherein said front panel has a leg on each side thereof which snap onto said drive.

20. The combination recited in claim 19, wherein each leg has a hook at the end thereof, each hook snapping onto said chassis.

* * * * *